United States Patent
Kaneko et al.

(10) Patent No.: US 11,300,023 B2
(45) Date of Patent: Apr. 12, 2022

(54) EXHAUST GAS PURIFICATION SYSTEM FOR INTERNAL COMBUSTION ENGINE

(71) Applicant: TOYOTA JIDOSHA KABUSHIKI KAISHA, Aichi-ken (JP)

(72) Inventors: Naoya Kaneko, Gotemba (JP); Hirofumi Kubota, Mishima (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 17/198,250

(22) Filed: Mar. 11, 2021

(65) Prior Publication Data
US 2021/0293167 A1    Sep. 23, 2021

(30) Foreign Application Priority Data

Mar. 23, 2020  (JP) .............................. JP2020-050543

(51) Int. Cl.
*F01N 3/023*    (2006.01)
*F02D 41/12*    (2006.01)
*B60W 10/10*    (2012.01)
*B60W 10/06*    (2006.01)
*B60W 10/02*    (2006.01)

(52) U.S. Cl.
CPC ......... *F01N 3/0233* (2013.01); *F02D 41/123* (2013.01); *B60W 10/0235* (2020.02); *B60W 10/06* (2013.01); *B60W 10/10* (2013.01)

(58) Field of Classification Search
CPC combination set(s) only.
See application file for complete search history.

(56) References Cited

U.S. PATENT DOCUMENTS

| | | | | |
|---|---|---|---|---|
| 9,821,796 | B2* | 11/2017 | Inoue | B60W 20/16 |
| 10,323,564 | B2* | 6/2019 | Gonze | F02D 41/064 |
| 10,450,979 | B2* | 10/2019 | Gibson | F02D 43/04 |
| 10,612,479 | B1* | 4/2020 | Dudar | F02M 25/089 |
| 10,753,304 | B2* | 8/2020 | Kuroda | F01N 3/101 |
| 2007/0204594 | A1* | 9/2007 | Ishii | F01N 3/023 60/274 |
| 2014/0350800 | A1* | 11/2014 | Yoshida | E02F 9/2285 701/50 |
| 2015/0019106 | A1* | 1/2015 | Cunningham | F02D 13/0207 701/102 |

FOREIGN PATENT DOCUMENTS

JP    200825376 A    2/2008

* cited by examiner

*Primary Examiner* — Binh Q Tran
(74) *Attorney, Agent, or Firm* — Hauptman Ham, LLP

(57) ABSTRACT

An exhaust gas purification system for an internal combustion engine includes a particulate filter (also referred to as GPF) to collect particulate matter (PM) in exhaust gas, an automatic transmission including a torque converter with a lock-up clutch, and a controller that controls the internal combustion engine to perform fuel cut when the internal combustion engine is decelerating and a temperature correlation value of lubricating oil (ATF) is higher than a determination value, and controls the automatic transmission to engage the lock-up clutch during execution of the fuel cut. The controller is configured to estimate a deposit amount of PM deposited on the GPF, and change the determination value to a smaller value than before the deposit amount exceeds a first deposit amount when the deposit amount exceeds a predetermined first deposit amount.

5 Claims, 12 Drawing Sheets

| Ne/KL | 10 | 20 | 30 | . | .. |
|---|---|---|---|---|---|
| 500 | 1 | 1 | 1 | | |
| 1000 | 1 | 2 | 3 | | |
| . | | | | | |
| .. | | | | | |
| ... | | | | | |

EXHAUST GAS PURIFICATION SYSTEM FOR INTERNAL COMBUSTION ENGINE

CROSS-REFERENCE TO RELATED APPLICATION

The present application claims priority under 35 U.S.C. § 119 to Japanese Patent Application No. 2020-050543, filed Mar. 23, 2020, the contents of which application are incorporated herein by reference in their entirety.

BACKGROUND

Field

The present disclosure relates to an exhaust gas purification system for an internal combustion engine, and more particularly, to an exhaust gas purification system for an internal combustion engine having a particulate filter for collecting particulate matter.

Background

For the purpose of improving the fuel economy of a vehicle powered by an internal combustion engine, fuel cut is sometimes carried out to stop fuel injection when the vehicle is decelerated. During fuel cut, the internal combustion engine may stall due to a decrease in the rotational speed of the output shaft. In the technology described in Japanese Patent Application Laid-Open No. JP2008-025376A, in a vehicle provided with a torque converter with a lock-up clutch, the lock-up clutch is controlled to an engaged state or a semi-engaged state during execution of a fuel cut to prevent stalling.

SUMMARY

Some gasoline engines with stoichiometric combustion are equipped with a gasoline particulate filter (also known as GPF) in an exhaust passage. The GPF collects particulate matter (also known as PM) discharged from internal combustion engines, thereby preventing the discharge of PM to the outside of the GPF. In a regeneration process for removing PM deposited on the GPF, it is necessary to raise the temperature of the GPF and supply oxygen to the GPF. In a gasoline engine, a regeneration process of the GPF is performed mainly during a fuel cut in which oxygen is supplied to the GPF.

Here, during the fuel cut, it is required to engage the lock-up clutch of the automatic transmission to prevent stalling of the internal combustion engine. However, the lock-up clutch is not always engageable. This is because, when the temperature of Automatic Transmission Fluid (also known as ATF), which is the lubricating oil of the automatic transmission, is extremely low temperature (e.g., −10° C.), the engagement of the lock-up clutch may cause a vibration called judder. Thus, in conditions where the engagement of the lock-up clutch is limited, such as when the ATF temperature is extremely low temperature, the execution of the fuel cut is also limited.

PM is particularly easy to emit when the internal combustion engine is cold. Therefore, under conditions where internal combustion engines are frequently performed to short trips, such as in extremely cold environments, the GPF may not have sufficient opportunity for the regeneration process, and the deposition amount of PM may increase. When the PM deposition amount in the GPF increases, the exhaust pressure increases due to the pressure loss increases, resulting in deterioration of combustion or fuel economy of the internal combustion engine.

The present disclosure has been made in view of the above problems, and an object thereof is to provide an exhaust gas purification system for an internal combustion engine with a GPF having a collecting function of PM, which can prevent an increase in the PM deposition amount by increasing the regeneration opportunity of GPF.

In order to solve the above-mentioned problems, the first disclosure is applied to an exhaust gas purification system of an internal combustion engine. The exhaust gas purification system includes a particulate filter located in an exhaust passage of the internal combustion engine and to collect particulate matter in exhaust gas, an automatic transmission including a torque converter with a lock-up clutch, and a controller that controls the internal combustion engine to perform fuel cut when the internal combustion engine is decelerating and a temperature correlation value of lubricating oil of the automatic transmission is higher than a determination value, and controls the automatic transmission to engage the lock-up clutch during execution of the fuel cut. The controller is configured to estimate a deposit amount of particulate matter deposited on the particulate filter, and change the determination value to a smaller value than before the deposit amount exceeds a first deposit amount when the deposit amount exceeds a predetermined first deposit amount.

The second disclosure has the following further features in the first disclosure. The controller is configured to execute lean air-fuel ratio control that changes a target air-fuel ratio of the internal combustion engine to a leaner air-fuel ratio than before the deposit amount exceeds the second deposit amount when the deposit amount exceeds a second deposit amount which is larger than the first deposit amount.

The third disclosure further has the following features in the second disclosure. In the lean air-fuel ratio control, the controller is configured to prohibit a change of the target air-fuel ratio to a lean air-fuel ratio when the intake air amount of the internal combustion engine is larger than a predetermined determination air amount.

The fourth disclosure has the following features in the second or third disclosure. In the lean air-fuel ratio control, the controller is configured to change the target air-fuel ratio of the internal combustion engine to a lean air-fuel ratio within a range that does not reach the combustion fluctuation limit of the internal combustion engine.

The fifth disclose has the following features in any one of the second to fourth disclosures. In the lean air-fuel ratio control, the controller is configured to change the target air-fuel ratio to a lean air-fuel ratio as a water temperature of the internal combustion engine is higher.

According to the first disclosure, when the deposition amount of PM on the particulate filter is increased, it is possible to increase the opportunity of performing the fuel cut during the deceleration. This makes it possible to increase the opportunity to regenerate the particulate filter, thereby preventing an increase in the deposition amount of PM.

According to the second disclosure, it is possible to improve the regeneration efficiency of the particulate filter by changing the target air-fuel ratio to the lean air-fuel ratio.

According to the third disclosure, when the intake air amount is larger than the determination air amount, the change of the target air-fuel ratio to the lean air-fuel ratio is prohibited. As a result, it is possible to prevent the amount of discharged NOx from increasing.

Further, according to the fourth disclosure, it is possible to prevent the lean air-fuel ratio from being controlled beyond the combustion fluctuation limit of the internal combustion engine.

Further, according to the fifth disclosure, it is possible to optimize the lean air-fuel ratio according to the water temperature.

DETAILED DESCRIPTION

Hereinafter, embodiments of the present disclosure will be described with reference to the accompanying drawings. However, it is to be understood that even when the number, quantity, amount, range or other numerical attribute of each element is mentioned in the following description of the embodiment, the present disclosure is not limited to the mentioned numerical attribute unless explicitly described otherwise, or unless the present disclosure is explicitly specified by the numerical attribute theoretically. Furthermore, structures or steps or the like that are described in conjunction with the following embodiment is not necessarily essential to the present disclosure unless explicitly described otherwise, or unless the present disclosure is explicitly specified by the structures, steps or the like theoretically.

1. First Embodiment

The first embodiment will be described with reference to drawings.

1-1. Configuration of First Embodiment

Figure 1:
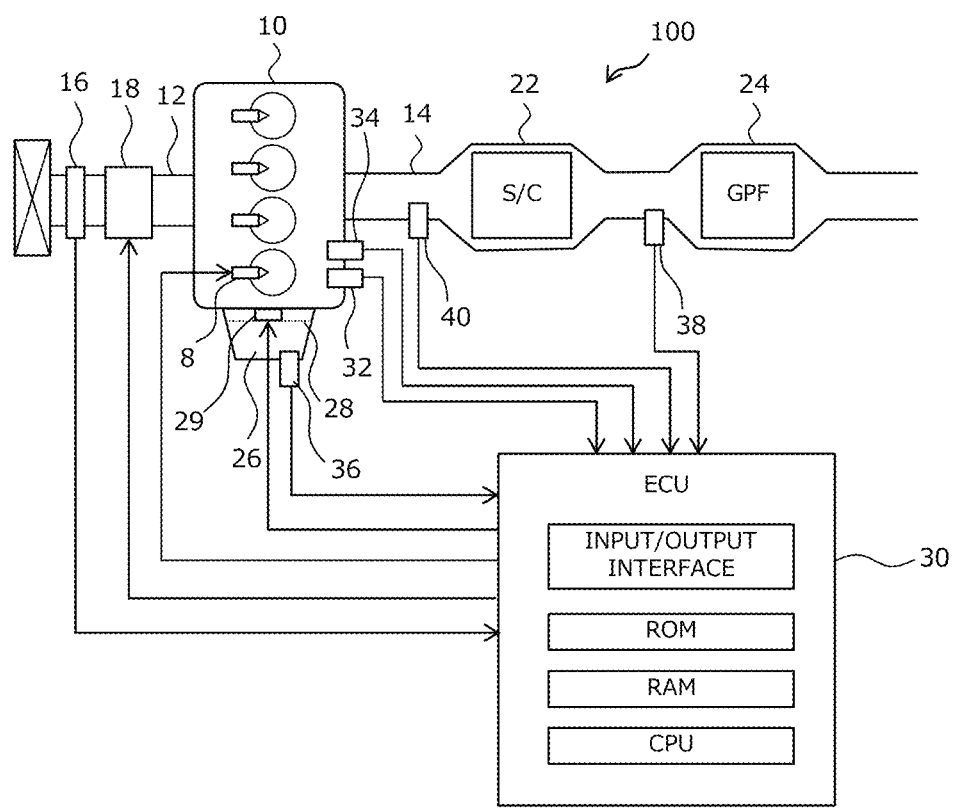
FIG. 1 is a diagram for explaining a configuration of an exhaust gas purification system according to a first embodiment.

FIG. 1 is a diagram for explaining a configuration of an exhaust gas purification system according to the first embodiment. As shown in FIG. 1, an exhaust gas purification system 100 of the present embodiment includes an internal combustion engine 10 (also referred to simply as an engine). The engine 10 is mounted on a vehicle as a power source. The engine 10 is a gasoline engine based on stoichiometric combustion. The engine 10 is provided with four cylinders in series, an injector 8 is provided for each cylinder. The engine 10 is connected to an intake manifold and an exhaust manifold (not shown). The intake manifold is connected to an intake passage 12 to take intake air into the engine 10. The exhaust manifold is connected to an exhaust passage 14 to discharge exhaust gas from the engine 10 into the atmosphere.

An air flow meter 16 to detect an intake air amount is disposed in the middle of the intake passage 12. A throttle valve 18 is disposed on the intake downstream side of the air flow meter 16 in the intake passage 12, A start converter (also referred to as an S/C) 22, which is a three-way catalyst, is disposed in the exhaust passage 14. A particulate filter (also referred to as GPF) 24 is disposed on the exhaust downstream side of the start converter 22 in the exhaust passage 14. The GPF 24 collects particulate matter discharged from the engine 10.

A crank shaft of the engine 10 is connected to an input shaft of an automatic transmission 26 via a torque converter 28. The torque converter 28 incorporates a lock-up clutch 29 for directly engaging an output shaft of the engine 10 with the input shaft of the automatic transmission 26.

The exhaust gas purification system 100 according to the present embodiment includes an ECU (also referred to as an Electronic Control Unit) 30. The ECU 30 is a controller for comprehensively controlling the entire exhaust gas purification system, and the controller according to the present disclosure is embodied as one function of the ECU 30.

The ECU 30 has at least an input/output interface, a ROM, a RAM, and a CPU. The input/output interface inputs signals of sensors provided in the exhaust gas purification system 100 and outputs operation signals to actuators provided in the engine 10. The sensors are mounted in various places of the exhaust gas purification system 100. An air-fuel ratio sensor 40 for detecting the air-fuel ratio A/F of the exhaust gas is disposed on the upstream side of the start converter 22 in the exhaust passage 14. An exhaust temperature sensor 38 for detecting the bed temperature of the GPF 24 is disposed on the upstream side of the GPF 24 in the exhaust passage 14. Furthermore, a rotational speed sensor 32 for detecting the engine speed NE of the engine 10, a water temperature sensor 34 for detecting the engine water temperature thw of the engine 10, an oil temperature sensor 36 for detecting the temperature of the lubricating oil (i.e. ATF) of the automatic transmission 26 (ATF temperature) and the like are also disposed. The ECU 30 processes the signals of the respective sensors taken and operates the respective actuators according to predetermined control programs.

The actuator operated by the ECU 30 includes the injector 8, the throttle valve 18, the lock-up clutch 29 of the torque converter 28, and the like. The ROM stores various control data including various control programs and maps for controlling the engine 10. The CPU reads out and executes the one or more control programs from the ROM, and generates one or more operation signals based on the input sensor signal. There are many more actuators and sensors connected to the ECU 30 than shown in the drawing, but their descriptions are omitted in the specification.

Figure 2:
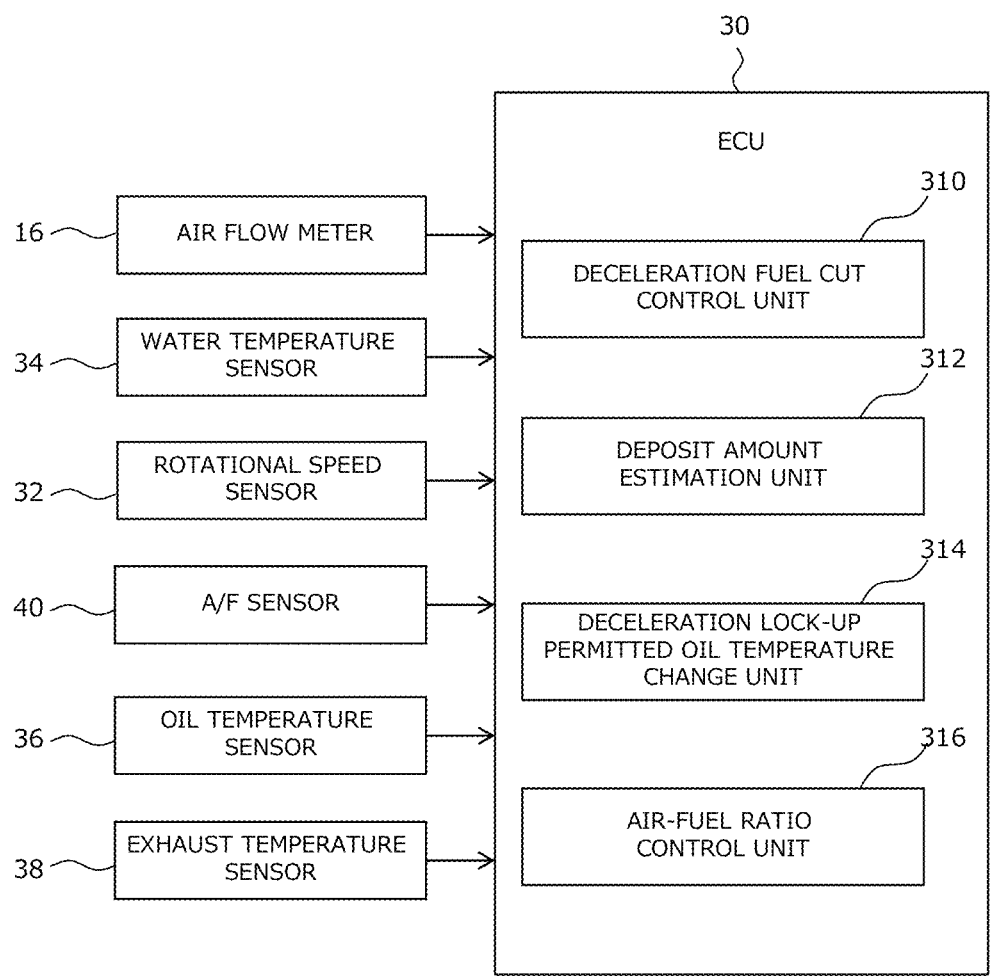
FIG. 2 is a diagram showing functional blocks of an ECU.

FIG. 2 is a diagram showing functional blocks of the ECU. The ECU 30 includes a deceleration fuel cut control unit 310, a deposit amount estimation unit 312, a deceleration lock-up permitted oil temperature change unit 314, and an air-fuel ratio control unit 316 as functional blocks for controlling the exhaust gas purification system 100. The processing executed in each function block will be described in detail below.

1-2. Basic Operation of Exhaust Gas Purification System of First Embodiment 1-2-1. Deceleration Fuel Cut Control The control of the engine 10 performed by the ECU 30 of the exhaust gas purification system 100 includes deceleration fuel cut control. The deceleration fuel cut control is executed in the deceleration fuel cut control unit 310 of the ECU 30. In the deceleration fuel cut control of the present embodiment, when a predetermined execution condition is satisfied during deceleration of the vehicle in which the engine 10 is mounted, for the purpose of improving the fuel consumption, the fuel injection from the injector 8 is stopped.

However, during deceleration fuel cut, since the rotational speed of the output shaft of the engine 10 decreases, there is a possibility that the engine 10 stalls. Therefore, the ECU 30 controls the lock-up clutch 29 of the torque converter 28 to the engaged condition during the deceleration fuel cut. Thus, since the output shaft of the engine 10 is forcibly rotated by the output shaft of the vehicle side during deceleration fuel cut, the stall of the engine 10 is prevented.

The execution conditions of the deceleration fuel cut include that the vehicle is decelerated and the lock-up clutch 29 can be engaged. Typically, the ECU 30 permits the engagement of the lock-up clutch 29 when the ATF temperature, which is the oil temperature of the lubricating oil of the automatic transmission 26, is higher than a predetermined deceleration lock-up permitted oil temperature during deceleration of the vehicle, and prohibits the engagement of the lock-up clutch 29 when the ATF temperature is lower than the predetermined deceleration lock-up permitted oil temperature. The deceleration lock-up permitted oil temperature is a determination value for determining whether the engagement of the lock-up clutch 29 is permitted or prohibited. Engaging the lock-up clutch 29 in an extremely cold environment may result in unacceptable drivability deterioration due to the judder phenomenon. Therefore, the deceleration lock-up permitted oil temperature is set to the lower limit temperature that is acceptable from the viewpoint of drivability, for example. This prevents the stall of the engine 10 during the deceleration fuel cut and also prevents the deterioration of drivability due to the judder phenomenon.

1-2-2. Specific Process of Deceleration Fuel Cut Control

Figure 3:
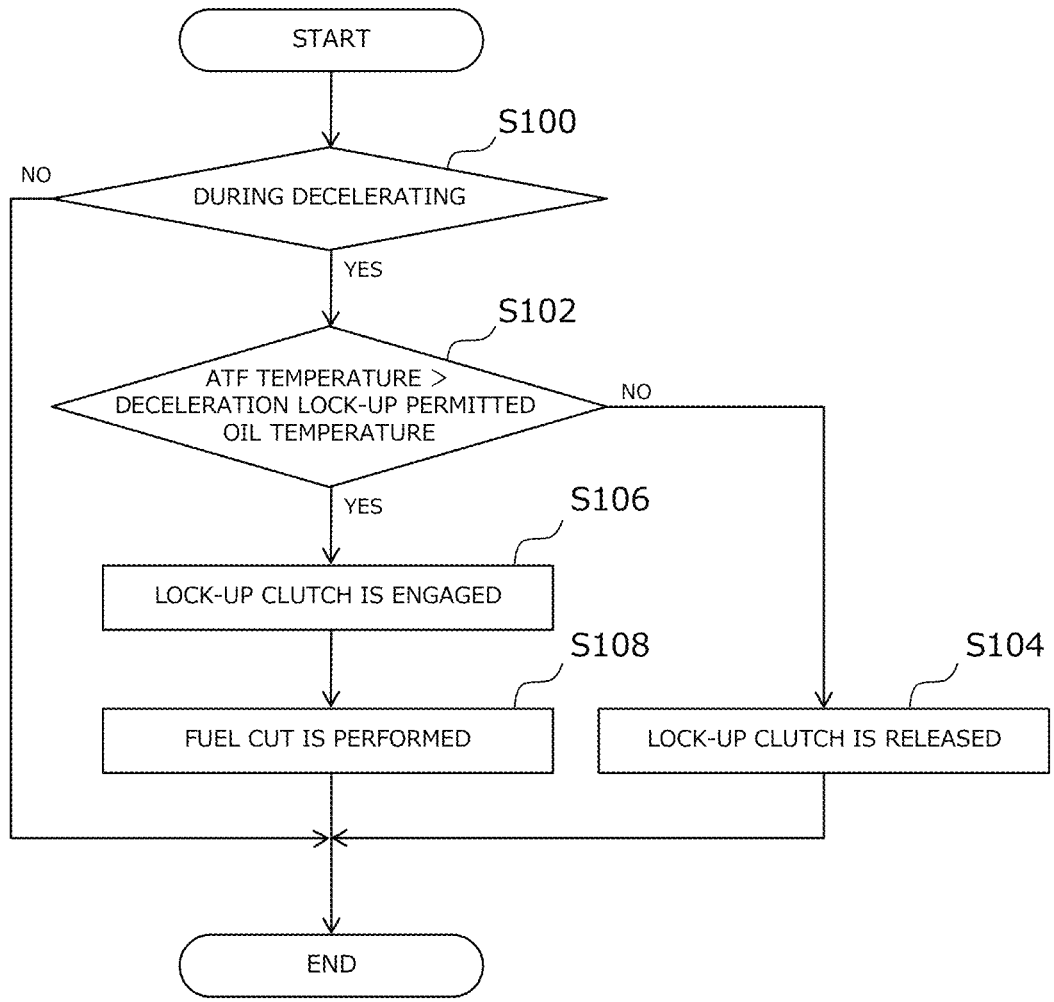
FIG. 3 is a flowchart showing a routine of a deceleration fuel cut control executed in the first embodiment.

Next, a specific process of the deceleration fuel cut control executed in the exhaust gas purification system 100 according to the first embodiment will be described with reference to a flowchart. FIG. 3 is a flowchart showing a routine of the deceleration fuel cut control executed in the first embodiment. The routine shown in FIG. 3 is repeatedly executed by the ECU 30 at a predetermined control cycle during operation of the engine 10.

In step S100 of the routine shown in FIG. 3, it is determined whether the vehicle with the engine 10 is decelerating. As a result, when the vehicle is decelerating, the process proceeds to step S102, and when the vehicle is not decelerating, the routine is terminated.

In the step S102, it is determined whether the ATF temperature is higher than the predetermined deceleration lock-up permitted oil temperature. As a result, when the determination is not satisfied, the process proceeds to the process of step S104, the lock-up clutch 29 is maintained in a released state (also referred to as "lock-up OFF"). When the process of step S104 is completed, the present routine is terminated.

On the other hand, when the determination is satisfied in the step S102, the process proceeds to step S106, the lock-up clutch 29 is engaged (also referred to as "lock-up ON"). When the process of step S106 is completed, the process proceeds to step S108. In step S108, the fuel cut is performed. When the process of step S108 is completed, the present routine is terminated.

1-2-3. PM Collection and Regeneration Process of GPF

The GPF 24 collects the PM contained in the exhaust gas discharged from the engine 10. Collected PM accumulates in the GPF 24. In order to continuously collect PM in the GPF 24, a regeneration process is required to remove the PM deposited in the GPF 24 and regenerate the collection capacity of the GPF 24. One such regeneration process is to passively burn off the collected PM by exposing the GPF 24 to a high temperature and lean atmosphere. In gasoline engines based on stoichiometric combustion, the heat from the exhaust during normal operation can be used to raise the temperature of the GPF 24 to a temperature at which the regeneration process can be executed. Also, the lean atmospheres in the GPF 24 is typically achieved during deceleration fuel cut of the engine 10. That is, the regeneration process of the GPF 24 is passively executed during the deceleration fuel cut after the GPF 24 is warmed up.

1-3. Characteristic Operation of Exhaust Gas Purification System of First Embodiment 1-3-1. Outline of Deceleration Lock-Up Permitted Oil Temperature Changing Process Next, a description will be given of a deceleration lock-up permitted oil temperature changing process which is a characteristic operation of the exhaust gas purification system according to the first embodiment. The engine 10 discharges a large amount of PM during the period from engine start until the cylinder walls and other parts are warmed up. The amount of PM emissions tends to increase with lower cylinder wall temperatures. Especially in extremely cold environments where the ambient temperature is below 0° C., PM emissions tend to increase exponentially.

In such an extremely cold environment, assume a situation where the engine 10 repeatedly short trips. Since the GPF 24 is disposed in the exhaust passage 14, it is warmed up to the bed temperature where the regeneration process is possible even in a cold start in under extremely cold environment. However, the ATF that lubricates the automatic transmission 26 tend to have a slower temperature rise than the GPF 24. Therefore, in a situation where the engine 10 repeats short trips in the extremely cold environment, the ATF temperature may not reach the deceleration lock-up permitted oil temperature, and there is a possibility that the execution opportunity of the deceleration fuel cut may not be sufficiently obtained. If the collected PM amount continues to be larger than the PM amount regenerated in the GPF 24, the PM deposition amount in the GPF 24 continues to increase. Excessive PM accumulation in the GPF 24 causes combustion deterioration and fuel economy deterioration due to the increase in exhaust pressure.

Therefore, the exhaust gas purification system 100 of the present embodiment is characterized in that the permitted oil temperature changing process for changing the permitted temperature in accordance with the PM deposition amount to the GPF 24. Typically, the deposit amount estimation unit 312 of the ECU 30 estimates the PM deposition amount in the GPF 24 based on the operating condition of the engine 10. Then, the deceleration lock-up permitted oil temperature change unit 314 of the ECU 30 changes the deceleration lock-up permitted oil temperature as a determination value during vehicle deceleration to a lower value than the normal value when the estimated deposition amount, which is the estimated PM deposition amount, is larger than a predetermined threshold value A. The deceleration lock-up permitted oil temperature change unit 314 is also referred to as a "determination value changing unit" because it changes the deceleration lock-up permitted oil temperature as a determination value. The threshold value A is a value predetermined by experimentation or simulation as the PM deposition amount which may cause combustion deterioration of the engine 10. The threshold value A is also referred to as a first deposition amount. According to such a control, it is possible to increase the opportunity of performing the moderated fuel cut in extreme cold conditions, it can be expected to reduce the PM deposition amount by the regeneration process of the GPF 24 is performed.

Figure 4:
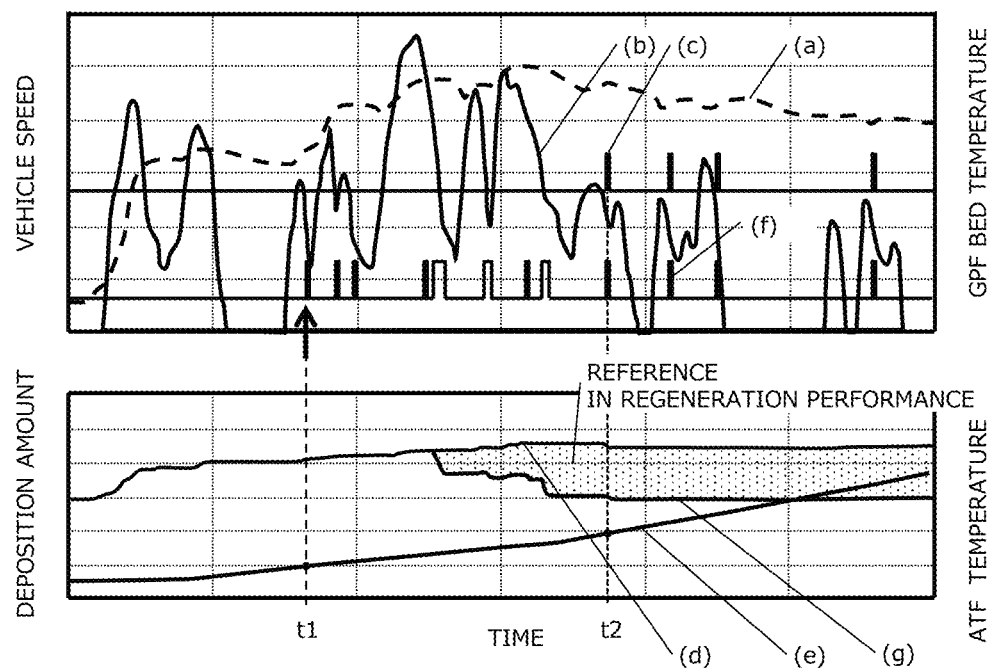
FIG. 4 is a timing chart for explaining the difference in regeneration performance of the GPF depending on whether a deceleration lock-up permitted oil temperature changing process is executed.

FIG. 4 is a timing chart for explaining the difference in regeneration performance of the GPF depending on whether the deceleration lock-up permitted oil temperature changing process is executed. In FIG. 4, (a) shows the time variation of the bed temperature of the GPF 24. (b) in FIG. 4 shows the time variation of the vehicle speed of the vehicle equipped with the engine 10. (c) in FIG. 4 shows whether the fuel cut is executed when the deceleration lock-up permitted oil temperature is not lowered. (d) in FIG. 4 shows the time variation of PM deposition amount in the GPF 24 when the deceleration lock-up permitted oil temperature has not been reduced. (e) in FIG. 4 shows the time variation of the ATF temperature, and (f) in FIG. 4 shows whether the fuel cut is executed when the deceleration lock-up permitted oil temperature is lowered. In FIG. 4, (g) shows the time variation in the PM deposition amount in the GPF 24 when the deceleration lock-up permitted oil temperature is lowered.

As shown in (e) of FIG. 4, when the permitted oil temperature changing process is not executed, for example, the ATF temperature reaches the deceleration lock-up permitted oil temperature at time t2. In this instance, as shown in (e) of FIG. 4, since an opportunity to execute the deceleration fuel cut is obtained after the time t2, the regeneration process of the GPF 24 is also performed after the time t2. As a result, as shown in (d) of FIG. 4, the PM deposition amount continues to increase until time t2, and consequently, the opportunity to execute the regeneration process is lost.

In contrast, as shown in (e) in FIG. 4, when the deceleration lock-up permitted oil temperature is reduced by the permitted oil temperature changing process, for example, the ATF temperature reaches the deceleration lock-up permitted oil temperature at an early time t1 than time t2. In this instance, as shown in (f) of FIG. 4, since an opportunity to execute the deceleration fuel cut is obtained after the time t1, the regeneration process of the GPF 24 is also performed after the time t1. As a result, as shown in (g) of FIG. 4, the PM deposition amount starts to decrease from the time t3, and the final PM deposition amount is greatly decreased from the PM deposition amount shown in (d) of FIG. 4.

Thus, according to the permitted oil temperature changing process, when the engine is started in an extremely cold environment, it is possible to start the regeneration process of the GPF 24 at an early stage. Thus, it is possible to reduce the PM deposition amount in the GPF 24, it is possible to prevent the combustion deterioration and fuel consumption deterioration of the engine 10.

1-3-2. Specific Process of Deceleration Lock-Up Permitted Oil Temperature Changing Process In the GPF 24, PM collection and PM removal by the regeneration process are performed simultaneously. The deposit amount estimation unit 312 of the ECU 30 constantly calculates an estimated total deposition amount, which is an estimated value of the total deposit amount of PM deposited in the GPF 24, during operation of the engine 10. First, a deposit amount estimation process in the GPF 24 will be described prior to the explanation of the specific process of the deceleration lock-up permitted oil temperature changing process.

1-3-3. Deposit Amount Estimation Process

Figure 5:
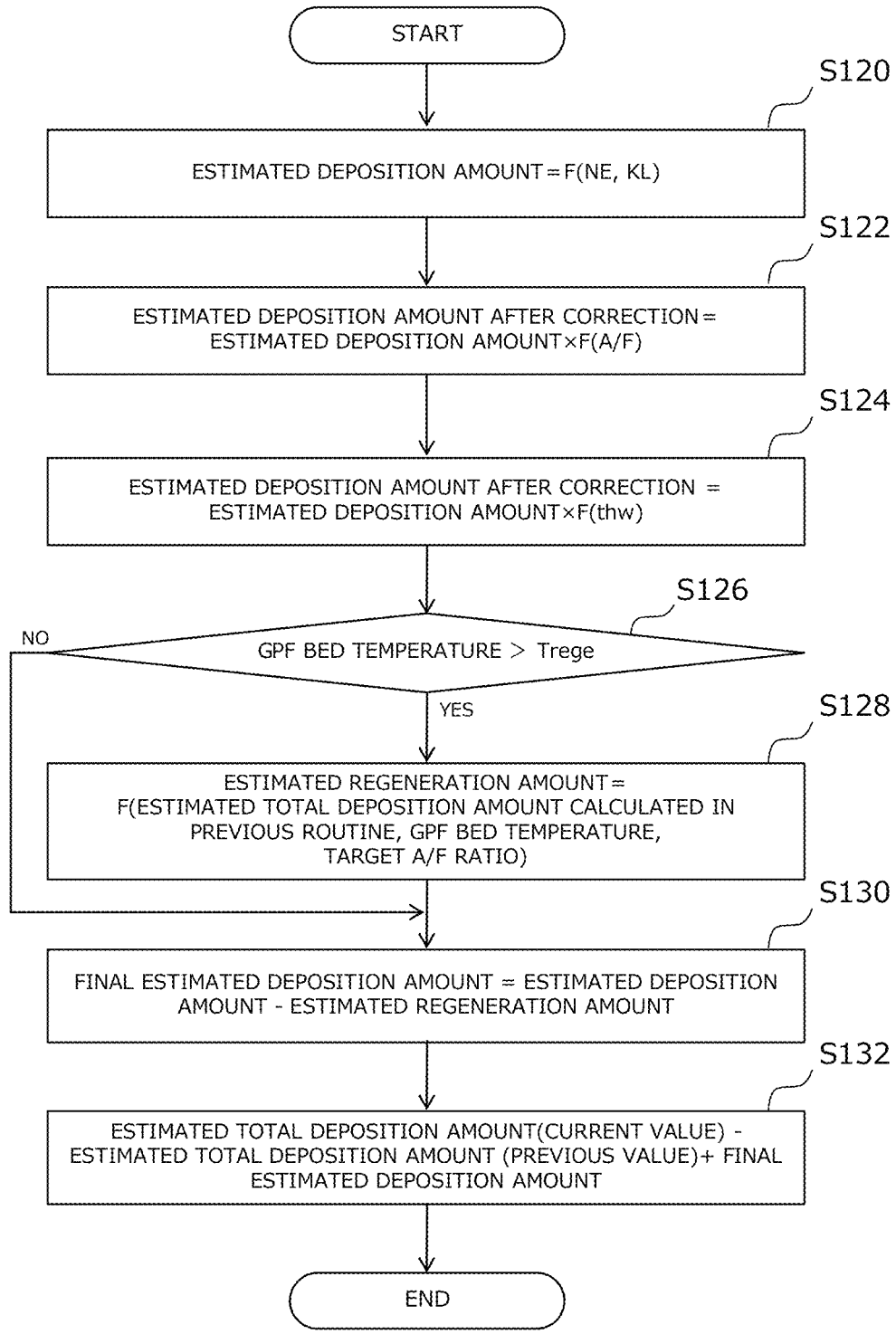
FIG. 5 is a flowchart showing a control routine of a deposition amount estimation process of PM executed in the ECU.

FIG. 5 is a flow chart showing a control routine of the deposition amount estimation process of PM executed in the ECU 30. The control routine shown in FIG. 5 is repeatedly executed at a predetermined control cycle during operation of the engine 10.

Figures 6, 7:
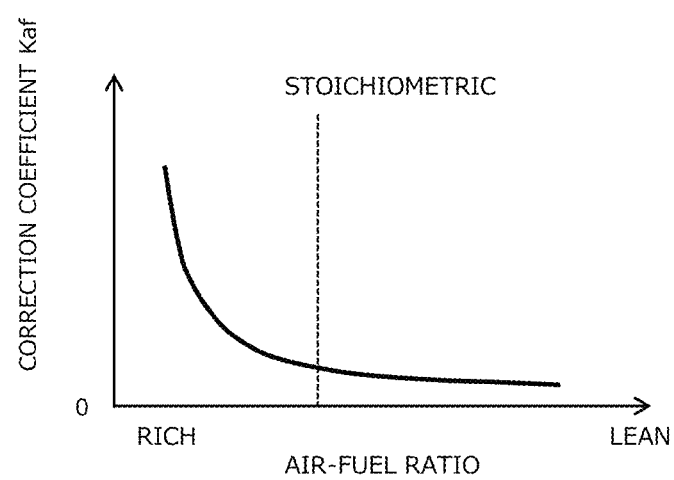
FIG. 6 is a diagram illustrating an example of a PM emission map defining an estimated deposition amount for engine speed NE and engine load KL.
FIG. 7 is a diagram illustrating an example of an air-fuel ratio correction map for calculating a correction coefficient of an estimated deposition amount with respect to an air-fuel ratio.

In step S120 of the control routine shown in FIG. 5, the estimated deposition amount of PM newly deposited in the GPF 24 is calculated in the present control routine. FIG. 6 is a diagram illustrating an example of a PM emission map defining an estimated deposition amount for the engine speed NE and the engine load KL. Here, using the PM emission map shown in FIG. 6, the estimated deposition amount corresponding to the present engine speed NE and the present engine load KL of the engine 10 is calculated.

In next step S122, the estimated deposition amount calculated in the process of the step S120 is corrected by the air-fuel ratio. FIG. 7 is a diagram illustrating an example of an air-fuel ratio correction map for calculating a correction coefficient of an estimated deposition amount with respect to an air-fuel ratio. The leaner the air-fuel ratio of the engine 10, the smaller the amount of PM discharged to the exhaust passage 14. Therefore, the air-fuel ratio correction coefficient Kaf is calculated as a value that becomes smaller as the air-fuel ratio is lean. Here, using the air-fuel ratio correction map shown in FIG. 7, the air-fuel ratio correction coefficient Kaf corresponding to the present air-fuel ratio detected by the air-fuel ratio sensor 40 is calculated. Then, the estimated deposition amount after correction is calculated by multiplying the estimated deposit amount calculated in the process of the step S120 by the air-fuel ratio correction coefficient Kaf.

Figure 8:
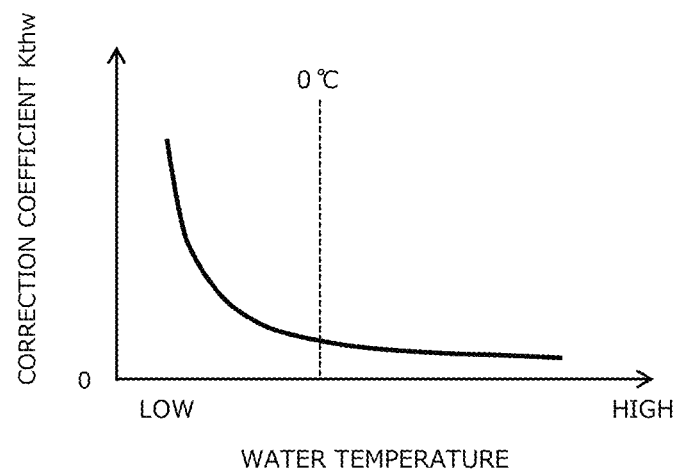
FIG. 8 is a diagram illustrating an example of a water temperature correction map for calculating a correction coefficient of an estimated deposition amount with respect to engine water temperature.

In next step S124, the estimated deposition amount calculated in the process of the step S122 is further corrected by the engine water temperature. FIG. 8 is a diagram illustrating an example of a water temperature correction map for calculating a correction coefficient of an estimated deposition amount with respect to engine water temperature. The higher the engine water temperature thw of the engine 10, the smaller the amount of PM discharged to the exhaust passage 14. Therefore, the water temperature compensation coefficient Kthw is calculated as a value that becomes smaller as the engine water temperature is higher. Here, using the water temperature correction map shown in FIG. 8, the water temperature correction coefficient Kthw corresponding to the present engine water temperature thw detected by the water temperature sensor 34 is calculated. Then, the estimated deposition amount after correction is calculated by multiplying the estimated deposition amount calculated by the process of the step S122 by the water temperature correction coefficient Kthw.

In next step S126, it is determined whether the GPF bed temperature of the GPF 24 is higher than a predetermined bed temperature Trege. As the predetermined bed temperature Trege, a predetermined value is used as a lower limit value of the bed temperature at which the regeneration process is performed in the GPF 24. As a result, when the determination is not satisfied, the estimated regeneration amount, which is an estimated value of the regeneration amount in the GPF 24, is 0 (zero), and the process proceeds to step S130. On the other hand, when the determination of the step S126 is satisfied, the process proceeds to step S128.

Figure 9:
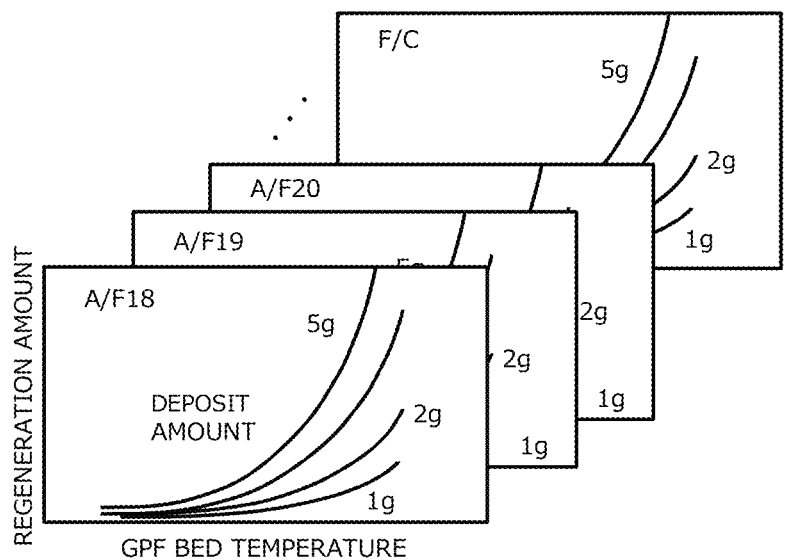
FIG. 9 is a diagram showing an example of a regeneration amount map for calculating an estimated regeneration amount.

In step S128, the estimated regeneration amount in the GPF 24 is calculated. FIG. 9 is a diagram showing an example of a regeneration amount map for calculating an estimated regeneration amount. The greater the PM deposition amount in the GPF 24, the greater the regeneration amount in the GPF 24. Further, the higher the bed temperature of the GPF 24, the greater the regeneration amount in the GPF 24. In addition, the more lean the air-fuel ratio of the exhausted air flowing into the GPF 24, the greater the regeneration amount in the GPF 24. The regeneration amount map shown in FIG. 9 relates the regeneration amount in the GPF 24 to the PM deposition amount of the GPF 24, the bed temperature of the GPF 24, and the air-fuel ratio of the exhaust. Here, the estimated total deposition amount calculated in the previous routine, the regeneration amount corresponding to the bed temperature of the GPF 24 detected by the exhaust temperature sensor 38 is calculated from the regeneration amount map as the estimated regeneration amount. When the process of step S128 is completed, the process proceeds to step S130.

In step S130, the final estimated deposition amount in the routine is calculated by subtracting the estimated regeneration amount calculated in the step S128 from the estimated deposition amount calculated in the step S124. In the next step S132, a current value of the estimated total deposition amount in the GPF 24 is calculated. Here, the current value of the estimated total deposition amount is calculated by adding the estimated deposition amount calculated in the step S130 of the current routine to a previous value of the estimated total deposition amount calculated in the previous routine.

1-3-4. Deceleration Lock-Up Permitted Oil Temperature Changing Process

Figure 10:
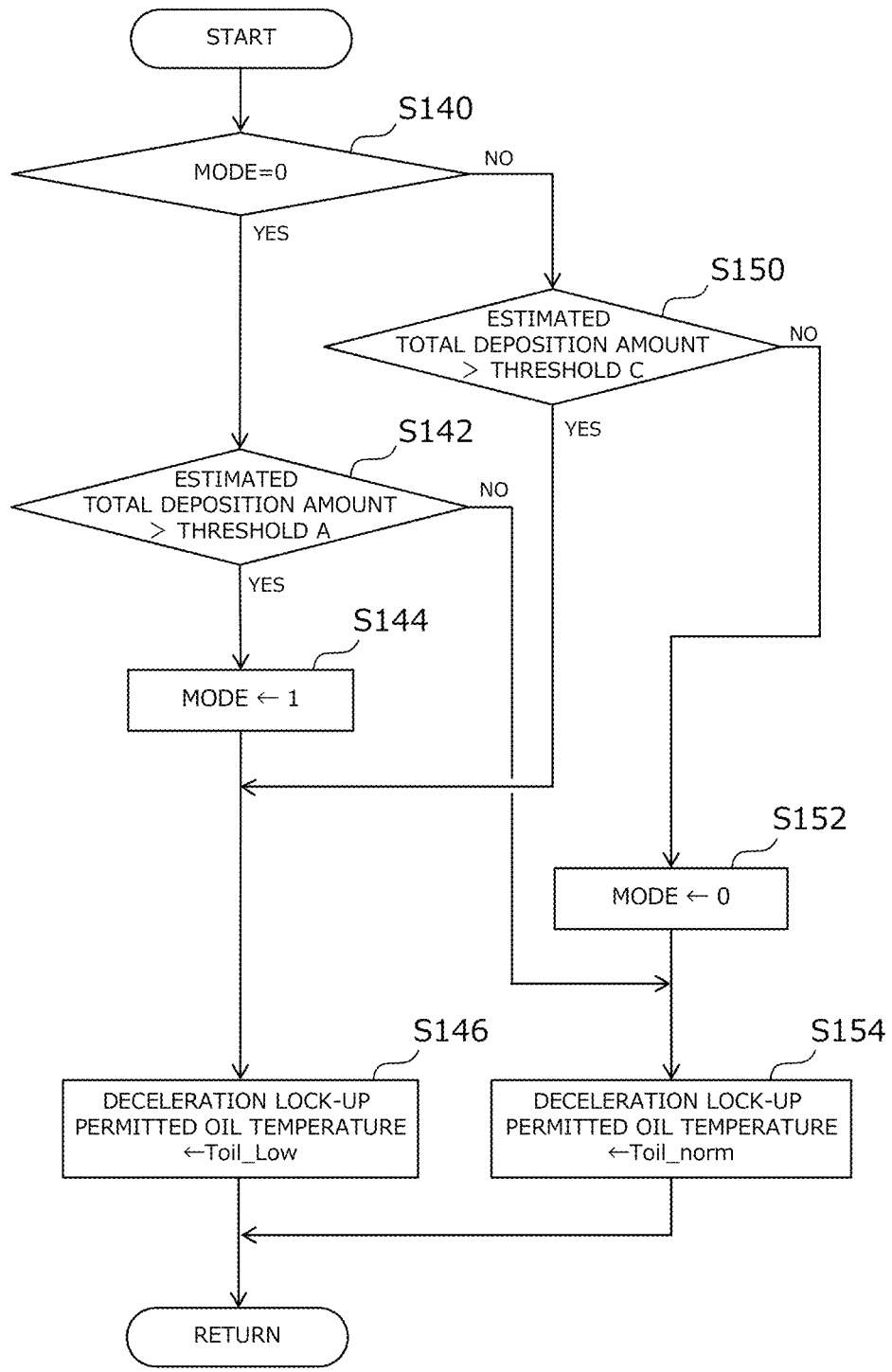
FIG. 10 is a flowchart showing a routine of a permitted oil temperature changing process executed by the exhaust gas purification system according to the first embodiment.

Next, the deceleration lock-up permitted oil temperature changing process will be described. The deceleration lock-up permitted oil temperature changing process is executed by the deceleration lock-up permitted oil temperature change unit 314 of the ECU 30. FIG. 10 is a flowchart showing a routine of the permitted oil temperature changing process executed by the exhaust gas purification system according to the first embodiment. The control routine shown in FIG. 10 is repeatedly executed at a predetermined control cycle during operation of the engine 10. In step S140 of the routine shown in FIG. 10, it is determined that MODE=0 is established. The deceleration lock-up permitted oil temperature is set to either Toil_norm, which is a normal deceleration lock-up permitted oil temperature, or Toil_Low, which is lower than Toil_norm. The "MODE" is a flag for determining the currently set deceleration lock-up permitted oil temperature. When MODE=0, the deceleration lock-up permitted oil temperature is set to Toil_norm, and when MODE=1, the deceleration lock-up permitted oil temperature is set to Toil_Low. As a result of the determination in step S140, when MODE=0, the process proceeds to step S142.

In next step S142, it is determined whether the estimated total deposition amount estimated in the deposition amount estimation process of PM is greater than a threshold value A. As a result, when it is determined that the determination is not satisfied, the process proceeds to step S154, and the deceleration lock-up permitted oil temperature is maintained at Toil_norm.

On the other hand, if it is determined in step S142 that the determination is satisfied, the process proceeds to step S144. In step S144, MODE is set to 1, and the process proceeds to step S146. In step S146, the deceleration lock-up permitted oil temperature is set to Toil-Low.

When MODE is not 0 in the determination of step S140, the current deceleration lock-up permitted oil temperature has been set to Toil_Low. In this case, the process proceeds to step S150, and it is determined whether the estimated total deposition amount estimated in the deposition amount estimation process of PM is larger than a threshold value C. The threshold value C is a threshold value of the estimated total deposition amount to prevent hunting of the setting of the deceleration lock-up permitted oil temperature, and is set to a neighborhood value smaller than the threshold value A. When the determination is satisfied, the process proceeds to step S146, and the deceleration lock-up permitted oil temperature is maintained at Toil-Low. On the other hand, if the determination is not satisfied in step S150, the process proceeds to step S152.

In step S152, MODE is set to 0, and the process proceeds to step S154. In step S154, the deceleration lock-up permitted oil temperature is set to Toil_norm.

As described above, according to the permitted oil temperature changing process executed in the exhaust gas purification system 100 of the first embodiment, the deceleration lock-up permitted oil temperature is changed in accordance with the estimated total deposition amount in the GPF 24. This make it possible to start the regeneration process of the GPF 24 at an early stage, since the opportunity of deceleration fuel cut can be obtained at an early stage when the engine is started in an extremely cold environment.

1-4. Modification of System of First Embodiment

The exhaust gas purification system 100 according to the first embodiment may adopt a modified configuration as described below.

The specific method of the deposition amount estimation process is not limited. That is, the estimated total amount of PM deposited in the GPF 24 may be calculated by using another known method such as a method using a differential pressure between front and rear of the GPF 24. This modification can be similarly applied to the exhaust gas purification system of second embodiment described later.

In the deceleration lock-up permitted oil temperature changing process, the deceleration lock-up permitted oil temperature may be changed to three or more stages according to the estimated total accumulated amount of PM in the GPF 24. According to such a configuration, since the setting of the deceleration lock-up permitted oil temperature according to the PM deposition amount in the GPF 24 is more subdivided, it is possible to optimize both suppression of over-deposition of PM and drivability.

The deceleration lock-up permitted oil temperature changing process is intended to change the lock-up permitted oil temperature during deceleration of the vehicle, and does not include a change in the lock-up permitted oil temperature other than during deceleration. Therefore, the setting of the lock-up permitted oil temperature other than during deceleration is not limited, but for example, it can be set to a fixed value (e.g., Toil_norm) regardless of the PM deposition amount. When the lock-up clutch 29 is released, more work is required of the engine 10 due to the lower transmission efficiency compared to the engaged state. Therefore, according to such a configuration, it is possible to restrict the lock-up clutch 29 from being allowed to engage except during deceleration until the ATF oil temperature exceeds the Toil_norm. As a result, it is possible to promote an increase in the exhaust-gas temperature, which contributes to an early warm-up of the GPF 24. This modification can be similarly applied to the exhaust gas purification system of second embodiment described later.

The permission determination of the lock-up of the lock-up clutch 29 is not limited to the control using the ATF temperature, and other values having a correlation with the ATF temperature may be used. Such temperature correlation values include, for example, the engine water temperature of the engine 10, the oil temperature of the engine oil for lubricating the inside of the engine 10, and the like. This modification can be similarly applied to the exhaust gas purification system of second embodiment described later.

2. Second Embodiment

Next, an exhaust gas purification system according to second embodiment will be described.

2-1. Configuration of Exhaust Gas Purification System According to Second Embodiment The configuration of the exhaust gas purification system according to the second embodiment is the same as that of the exhaust gas purification system 100 of the first embodiment shown in FIG. 1. Therefore, a detailed description of the exhaust gas purification system according to the second embodiment is omitted.

2-2. Features of Exhaust Gas Purification System According to Second Embodiment

In the exhaust gas purification system 100 of the first embodiment, the regeneration process is accelerated from an early stage by obtaining an opportunity for deceleration fuel cut at an early stage in a cold environment. In contrast, the exhaust gas purification system 100 of the second embodiment is characterized by lean air-fuel ratio control, which changes the target air-fuel ratio to lean when there is a possibility that cannot be coped with by only the deceleration fuel cut. The lean air-fuel ratio control is executed by the air-fuel ratio control unit 316 of the ECU 30.

Figure 11:
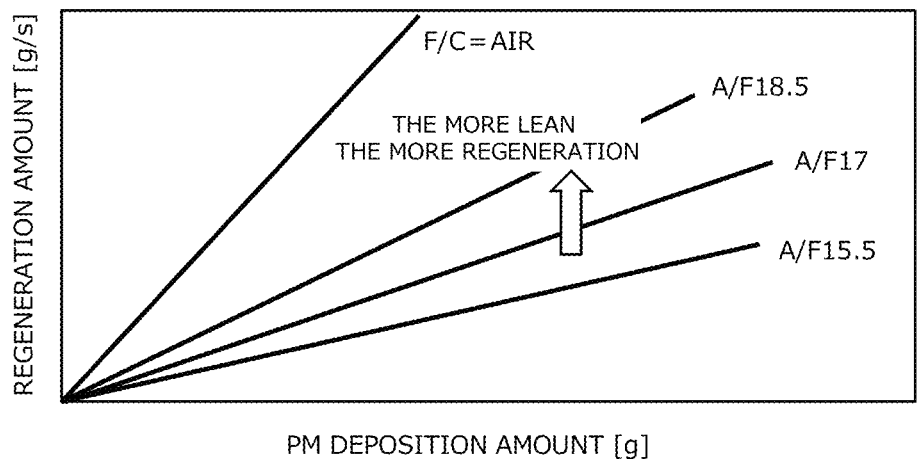
FIG. 11 is a diagram showing a relationship between the regeneration amount and the PM deposition amount in the GPF for each air-fuel ratio.

FIG. 11 is a diagram showing a relationship between the regeneration amount and the PM deposition amount in the GPF for each air-fuel ratio. As shown in FIG. 11, the regeneration amount in the GPF 24 tends to increase as the air-fuel ratio becomes leaner. Therefore, if the target air-fuel ratio is controlled to the lean air-fuel ratio, the regeneration efficiency of the GPF 24 can be increased.

Figure 12:
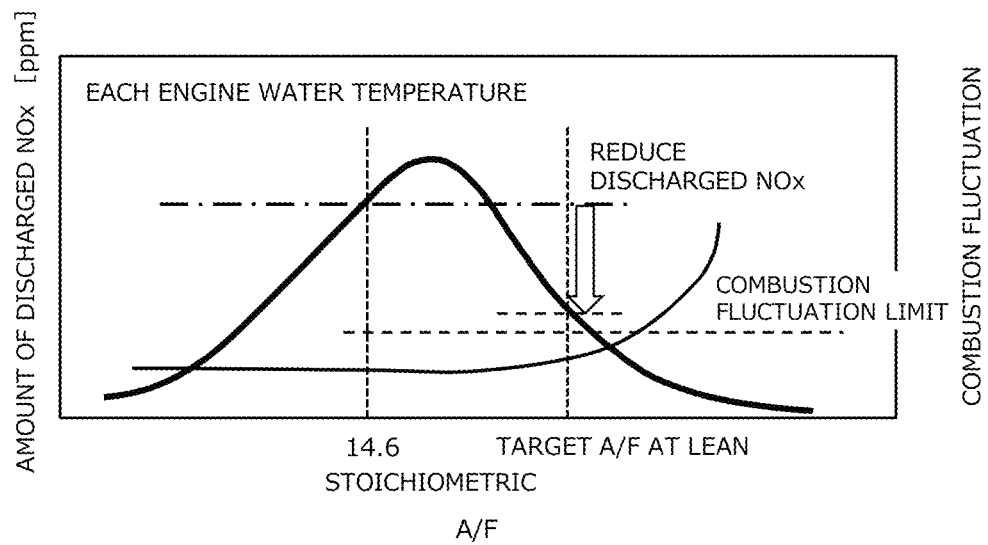
FIG. 12 is a diagram showing a relationship of the combustion fluctuation and the amount of discharged NOx with respect to the air-fuel ratio.

However, the target air-fuel ratio in the lean air-fuel ratio control is not controlled lean without limitation. FIG. 12 is a diagram showing a relationship of the combustion fluctuation and the amount of discharged NOx with respect to the air-fuel ratio. As shown in FIG. 12, the amount of discharged NOx tendencies to be a maximum at the time of slight lean, for example, A/F=16, and then to decrease as it becomes lean. In addition, the combustion fluctuation tends to be low during the period from stoichiometric to slight lean, but then increase sharply as the air-fuel ratio becomes leaner. Therefore, in the lean air-fuel ratio control, by controlling the lean air-fuel ratio within a range not exceeding the combustion fluctuation limit specified for each engine water temperature, it is possible to increase the regeneration efficiency of the GPF 24 while reducing the discharged NOx.

Figure 13:
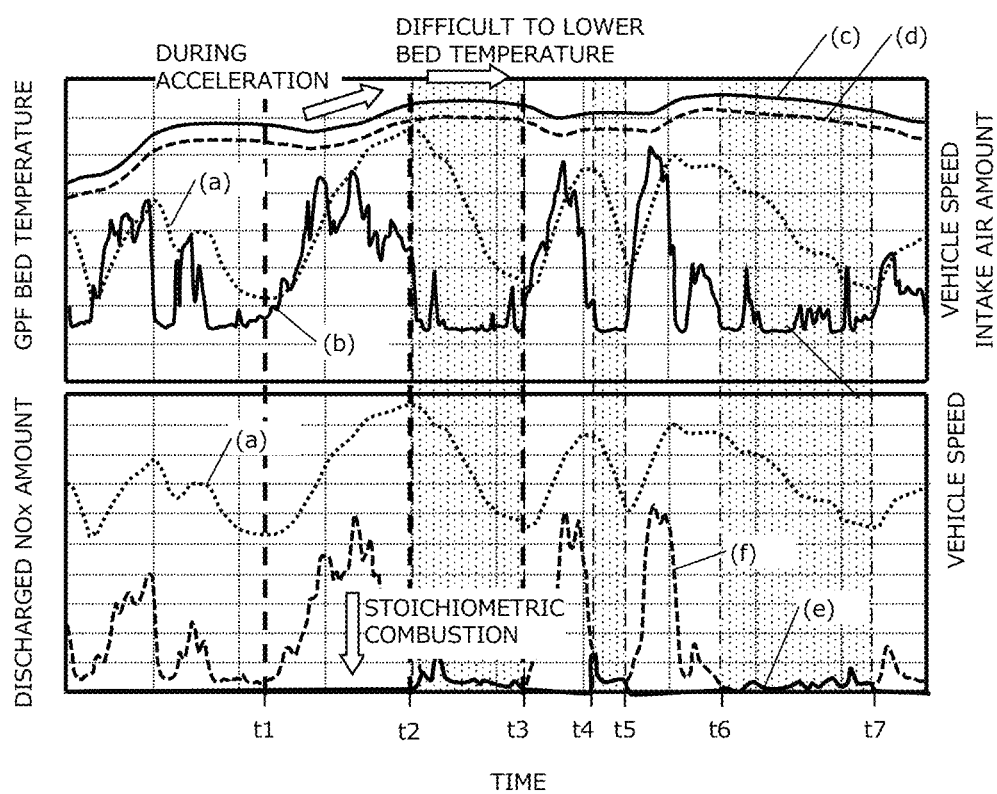
FIG. 13 is a timing chart for explaining the difference in changes in discharged NOx amount and GPF bed temperature according to the implementation timing of the lean air-fuel ratio control of a second embodiment.

The lean air-fuel ratio control is preferably performed only during a period in which the intake air amount is small, such as during deceleration of the vehicle. FIG. 13 is a timing chart for explaining the difference in changes in discharge NOx amount and GPF bed temperature according to the implementation timing of the lean air-fuel ratio control of the second embodiment. (a) in FIG. 13 shows a time variation in the vehicle speed of the vehicle on which the engine 10 is mounted, and (b) in FIG. 13 shows a time variation in the intake air amount. As shown in (a) and (b) of FIG. 13, a period from time t2 to time t3, a period from time t4 to time t5, and a period from time t6 to time t7 are deceleration periods in which the vehicle is mainly decelerating, and also periods in which the intake air amount is smaller than other periods. (c) in FIG. 13 shows the time variation of the GPF bed temperature when the lean air-fuel ratio control is limited to only this deceleration period, and (d) in FIG. 13 shows the time variation of the GPF bed temperature when the lean air-fuel ratio control is executed in the entire period. Furthermore, (e) in FIG. 13 shows the time variation of the amount of discharged NOx when the lean air-fuel ratio control is limited to only this deceleration period, and (f) in FIG. 13 shows the time variation of the amount of discharged NOx when the lean air-fuel ratio control is executed in the entire period.

As shown in FIG. 13, a period from time t1 to time t2 is a period during acceleration of the vehicle in which the vehicle speed and the intake air amount are increasing, and a period from time t2 to time t3 is a decelerating period. In the example shown in (f) in FIG. 13, since the lean air-fuel ratio control is executed during the period of acceleration, the amount of discharged NOx increases with an increase in the amount of suction air. On the other hand, since the intake air amount is small during the deceleration period, the discharged NOx is maintained at a small amount even when the lean air-fuel ratio control is executed.

In contrast, in the example shown in (e) in FIG. 13, since the lean air-fuel ratio control is not executed during the period during acceleration, the discharged NOx is kept low by the stoichiometric combustion. On the other hand, while the lean air-fuel ratio control is executed during the deceleration period, the exhaust NOx is maintained at a small amount because the intake air amount is small.

Thus, when the lean air-fuel ratio control is limited only to the deceleration period, it is possible to effectively suppress the increase in the amount of discharged NOx during both the acceleration and deceleration periods. Further, as shown in (e) and (f) in FIG. 13, in the deceleration period from time t2 to time t3, the intake air amount is small with respect to the heat capacity of the GPF 24, and therefore, even if the lean air-fuel ratio control is executed, the decrease in the GPF 24 bed temperature can be suppressed to a minimum.

Figure 14:
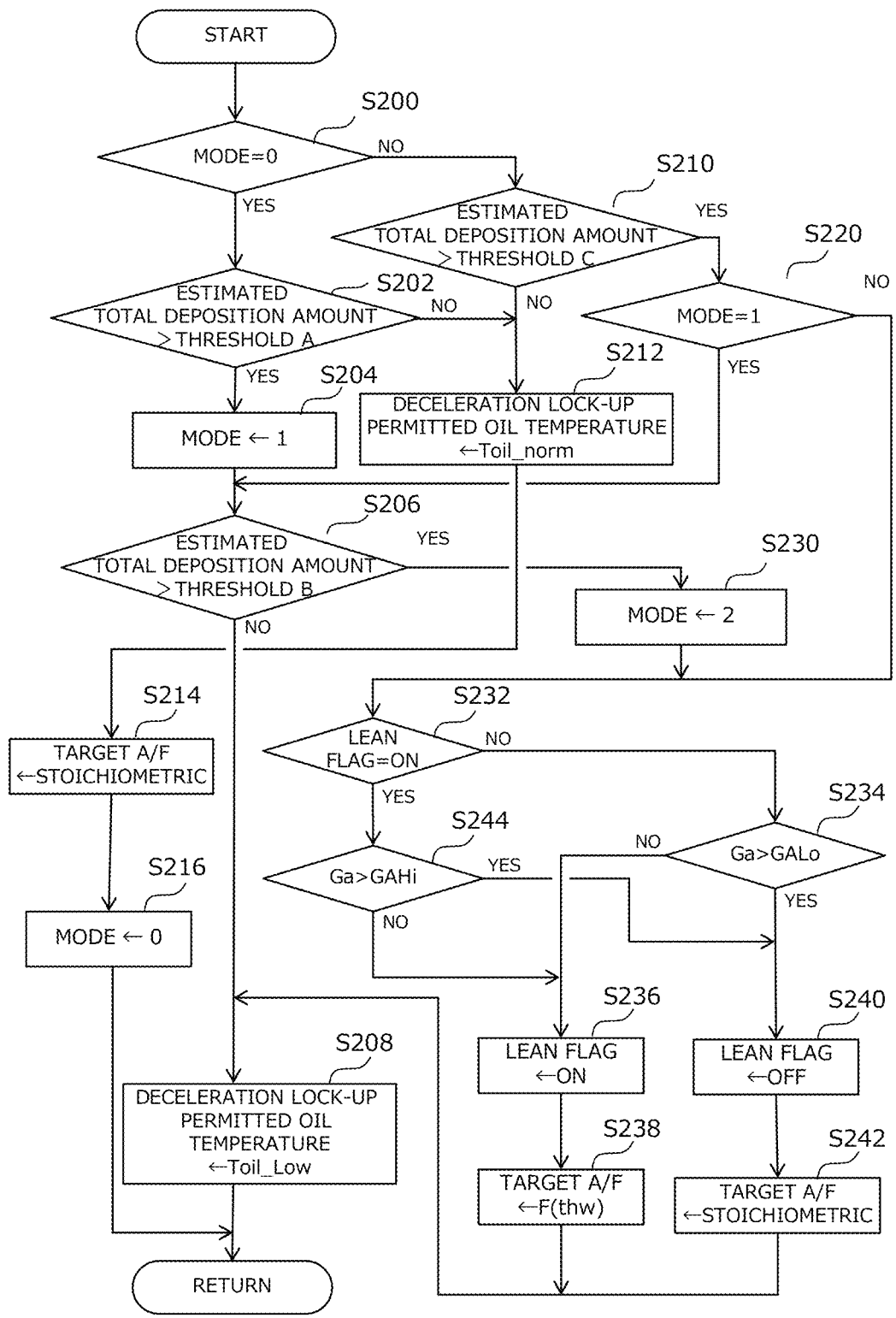
FIG. 14 is a flowchart of a control routine executed in the exhaust gas purification system according to the second embodiment.

2-3. Specifically Processing of Control Executed in Exhaust Gas Purification System of Second Embodiment FIG. 14 is a flowchart of a control routine executed in the exhaust gas purification system 100 according to the second embodiment. The control routine shown in FIG. 14 is repeatedly executed by the ECU 30 in a predetermined control cycle during the operation of the engine 10. In step S200 of the routine shown in FIG. 14, it is determined that MODE=0 is established. The "MODE" is a flag to determine the currently set deceleration lock-up permitted oil temperature and whether the lean air-fuel ratio control is executed or not. When MODE=0 is established, the deceleration lock-up permitted oil temperature is set to Toil_norm, and the lean air-fuel ratio control is not executed. When MODE=1 is established, the deceleration lock-up permitted oil temperature is set to Toil-Low, and the lean air-fuel ratio control is not executed. When MODE=2, the deceleration lock-up permitted oil temperature is set to Toil_Low, and the lean air-fuel ratio control is executed. As a result of the determination in step S200, when MODE=0, the process proceeds to step S202.

In the following step S202, it is determined whether the estimated total deposition amount estimated in the deposition amount estimation process of PM is greater than the threshold value A. As a result, when it is determined that the determination is not satisfied, the process proceeds to step S212, and the deceleration lock-up permitted oil temperature is maintained at Toil_norm.

On the other hand, when it is determined in step S202 that the determination is satisfied, the process proceeds to step S204. In step S204, MODE is set to 1, and the process proceeds to step S206.

When MODE is not 0 in the determination of step S200, the current deceleration lock-up permitted oil temperature has been set to Toil_Low. In this case, the process proceeds to step S210, and it is determined whether the estimated total deposition amount estimated in the deposition amount estimation process of PM is larger than the threshold value C. The process is the same as the step S150 of the control routine shown in FIG. 10. As a result, when the determination is not satisfied, it can be determined that the possibility of PM over-deposition in the GPF 24 is low. In this case, the process proceeds to step S212, where the deceleration lock-up permitted oil temperature is set to Toil_norm, in the next step S214, the target air-fuel ratio is set to stoichiometric, and in the next step S216, the target air-fuel ratio is set to MODE=0. When the process of step S216 is completed, this routine is terminated On the other hand, when it is determined in step S210 that the determination is satisfied, the process proceeds to step S220. In step S220, it is determined that MODE=1 is established. As a result, when it is determined that the determination is established, the process proceeds to step S206. In step S206, it is determined whether the estimated total deposition amount estimated in the deposition amount estimation process of PM is greater than a threshold value B. The threshold value B is larger than the threshold value A, and is also referred to as a second deposition amount. Consequently, if the estimated total deposition amount is less than or equal to the threshold value B, the process proceeds to next step S208, and the deceleration lock-up permitted oil temperature is set to Toil_Low. When the process of step S208 is completed, this control routine is terminated.

On the other hand, in the determination of step S206, when the estimated total deposition amount is larger than the threshold value B, it can be determined that the opportunity of deceleration fuel cut is not sufficiently obtained even if the deceleration lock-up permitted oil temperature changing process is executed. In this case, the process proceeds to next step S230, and MODE is set to 2. When the process of step S230 is completed, the process proceeds to next step S232.

When it is determined in step S220 that MODE=1 is not established, it is determined that the present MODE is 2, and the process proceeds to step S232. In step S232, it is determined whether a lean flag is ON. The lean flag is a flag for determining whether the present target air-fuel ratio is set to the lean air-fuel ratio by the lean air-fuel ratio control. As a result, when the lean flag is off, the process proceeds to step S234.

In step S234, it is determined whether the intake air amount Ga detected by the air flow meter 16 is larger than a GALo value which is a predetermined low Ga value. The GALo is a determination air amount determined in advance by experimentation or simulation as the intake air amount Ga that can suppress the discharged NOx to an acceptable level when the air-fuel ratio is controlled to a lean air-fuel ratio. Consequently, when the intake air amount Ga is equal to or less than GALo, it is determined that the lean air-fuel ratio control can be executed and the process proceeds to next step S236.

Figure 15:
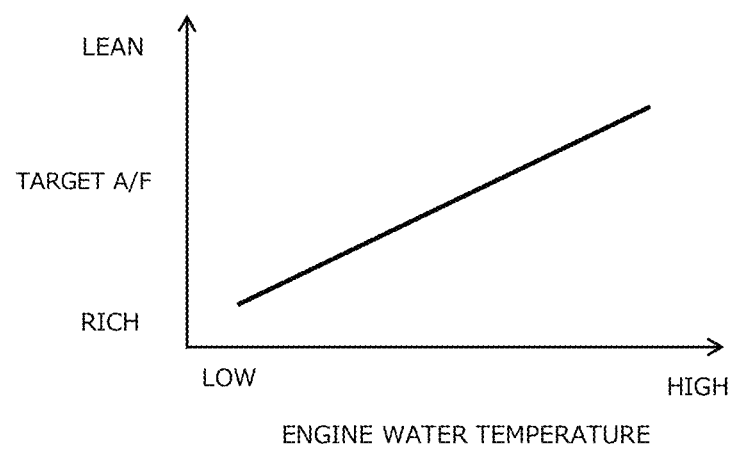
FIG. 15 is a map defining a relationship between the target air-fuel ratio and the engine water temperature.

In step S236, the lean flag is set to ON. In next step S238, the target air-fuel ratio is controlled to the lean air-fuel ratio by the lean air-fuel ratio control. FIG. 15 is a map defining the relationship between the target air-fuel ratio and the engine water temperature. In this map, lean limit values in the range not exceeding the combustion fluctuation limit are specified for each engine water temperature as the target air-fuel ratio. Typically, this map is specified so that the higher the engine water temperature, the leaner the target air-fuel ratio. Here, in accordance with the map shown in FIG. 15, the target air-fuel ratio is set to the value of the target air-fuel ratio corresponding to the engine water temperature thw detected by the water temperature sensor 34. When the process of step S238 is completed, the process proceeds to step S208, and the deceleration lock-up permitted oil temperature is set to Toil-Low.

On the other hand, in the determination of step S234, when the intake air amount Ga is larger than GALo which is the determined air amount, it is determined that the discharged NOx cannot be suppressed to an acceptable range in the operation by the lean air-fuel ratio, the process proceeds to next step S240. In step S240, the lean flag is set to OFF. In next step S242, the target air-fuel ratio is controlled to the stoichiometric air-fuel ratio. When the process of step S242 is completed, the processing shifts to step S208, and the deceleration lock-up permitted oil temperature is set to Toil-Low.

When the lean flag is ON in step S232, the process proceeds to step S244. In step S244, it is determined whether the intake air amount Ga detected by the air flow meter 16 is larger than a GAHi value which is a predetermined high Ga value. The GAHi is a threshold value of the intake air amount for preventing the setting of the air-fuel ratio from hunting between the lean air-fuel ratio and the stoichiometric air-fuel ratio, and is set to a neighborhood value that is larger than GALo. As a result, when the intake air amount Ga is equal to or less than GAHi value, the process proceeds to step S236 and the lean flag is turned ON, and when the intake air amount Ga is larger than GAHi value, the process proceeds to step S240 and the lean flag is turned OFF.

As described above, according to the permitted oil temperature changing process including the air-fuel ratio control executed in the exhaust gas purification system 100 of the second embodiment, the target air-fuel ratio can be controlled to the lean air-fuel ratio when the opportunity of the deceleration fuel cut cannot be sufficiently obtained even in the permitted oil temperature changing process. As a result, the regeneration process of the GPF 24 can be started from an early stage.

2-4. Modification of System of Second Embodiment

The exhaust gas purification system 100 according to the second embodiment may adopt a modified configuration as described below.

The setting of the target air-fuel ratio in the lean air-fuel ratio control is not limited to the method using the map of FIG. 15. That is, the target air-fuel ratio in the lean air-fuel ratio control may be a fixed value of the lean air-fuel ratio.

What is claimed is:

1. An exhaust gas purification system for an internal combustion engine, comprising:
   a particulate filter located in an exhaust passage of the internal combustion engine and to collect particulate matter in exhaust gas;
   an automatic transmission including a torque converter with a lock-up clutch; and
   a controller that controls the internal combustion engine to perform fuel cut when the internal combustion engine is decelerating and a temperature correlation value of lubricating oil of the automatic transmission is higher than a determination value, and controls the automatic transmission to engage the lock-up clutch during execution of the fuel cut,
   wherein the controller is configured to:
      estimate a deposit amount of particulate matter deposited on the particulate filter, and
      change the determination value to a smaller value than before the deposit amount exceeds a first deposit amount when the deposit amount exceeds a predetermined first deposit amount.

2. The exhaust gas purification system for the internal combustion engine according to claim 1,
   wherein, the controller is configured to execute lean air-fuel ratio control that changes a target air-fuel ratio of the internal combustion engine to a leaner air-fuel ratio than before the deposit amount exceeds the second deposit amount when the deposit amount exceeds a second deposit amount which is larger than the first deposit amount.

3. The exhaust gas purification system for the internal combustion engine according to claim 2,
   wherein in the lean air-fuel ratio control, the controller is configured to prohibit a change of the target air-fuel ratio to a lean air-fuel ratio when the intake air amount of the internal combustion engine is larger than a predetermined determination air amount.

4. The exhaust gas purification system for the internal combustion engine according to claim 2,
   wherein in the lean air-fuel ratio control, the controller is configured to change the target air-fuel ratio of the internal combustion engine to a lean air-fuel ratio within a range that does not reach the combustion fluctuation limit of the internal combustion engine.

5. The exhaust gas purification system for the internal combustion engine according to claim 2,
   wherein in the lean air-fuel ratio control, the controller is configured to change the target air-fuel ratio to a lean air-fuel ratio as a water temperature of the internal combustion engine is higher.

* * * * *